United States Patent [19]

Yamaguchi et al.

[11] Patent Number: 5,140,425
[45] Date of Patent: Aug. 18, 1992

[54] VISUAL PRESENTATION SYSTEM PROVIDING FOR A WIPING CHANGE FROM ONE SCENE TO ANOTHER

[75] Inventors: Hirohisa Yamaguchi; Yasuji Morioka, both of Tokyo, Japan

[73] Assignee: TEAC Corporation, Tokyo, Japan

[21] Appl. No.: 681,110

[22] Filed: Apr. 5, 1991

[30] Foreign Application Priority Data

Apr. 9, 1990 [JP] Japan .................... 2-93565
Apr. 9, 1990 [JP] Japan .................... 2-93567

[51] Int. Cl.$^5$ ............................................ H04N 5/262
[52] U.S. Cl. ........................................ 358/183; 358/22
[58] Field of Search ............... 358/183, 182, 181, 22

[56] References Cited

U.S. PATENT DOCUMENTS

| | | | |
|---|---|---|---|
| 4,199,790 | 4/1980 | Greenfield | 358/183 |
| 4,751,579 | 6/1988 | Okunishi | 358/183 |
| 4,833,538 | 5/1989 | Hieda | 358/182 |
| 4,943,856 | 7/1990 | Bakhmutshi | 358/22 |
| 5,023,720 | 6/1991 | Jardins | 358/183 |

FOREIGN PATENT DOCUMENTS

| | | | |
|---|---|---|---|
| 148317 | 11/1979 | Japan | 358/183 |
| 44862 | 3/1983 | Japan | 358/183 |

Primary Examiner—Tommy P. Chin
Attorney, Agent, or Firm—Woodcock Washburn Kurtz Mackiewicz & Norris

[57] ABSTRACT

One or more, preferably three, cathode ray tube displays are juxtaposed for simultaneous reproduction of correlated picture signals from video disk players or the like. Each disk player is connected to one of the displays via a serial connection of two frame memories each capable of storing the successive frames of a picture signal one at a time. A wipe control circuit is connected to the latter stage frame memories for causing a wiping change from old to new scenes to take place on the displays in any selected one of several different wipe modes. Upon commencement of a wiping scene change, the wipe control circuit first freezes the latter stage frame memories, thereby retaining the last frames of the old scenes thereon, and gradually replaces the last frames of the old scenes on the latter stage frame memories with the first frames of new scenes from the preceding stage frame memories. A wiping change from the old to the new scenes takes place on the displays as the latter stage frame memories are repeatedly read during the gradual repalcement of the last frames of the old scenes with the first frames of the new scenes.

8 Claims, 3 Drawing Sheets

VISUAL PRESENTATION SYSTEM PROVIDING FOR A WIPING CHANGE FROM ONE SCENE TO ANOTHER

BACKGROUND OF THE INVENTION

Our invention relates to a visual presentation system having one or more video disk players or like source or sources of a video signal or signals, and one or more display devices for visibly reproducing the video signal or signals. More particularly, our invention concerns such a visual presentation system featuring facilities for a change from one reproduced scene to another in a wiping mode. The visual presentation system according to our invention lends itself to use for the commercial publicity of new products and processes, the introduction of corporations and other establishments, the disclosure of scientific and technological theories and ideas, and a variety of other presentations addressed to limited audiences.

By the term "wiping" we means such a change from one reproduced scene to another that the area occupied by the new scene on the screen or screens is incremented, with corresponding decrement in the area occupied by the old scene, until the new scene totally replaces the old. A variety of different wiping modes are possible (FIG. 2), as will be explained subsequently in more detail.

The idea of juxtaposing a set of, three for example, displays for the simultaneous reproduction of as many correlated pictures is itself not new. Conventionally, the set of displays such as those of the familiar cathode ray tube construction have been separately connected to video tape recorders or players or decks. Loaded with magnetic tapes, the video tape decks have been driven synchronously under the direction of an electronic control device. The magnetic tapes have correlated picture signals prerecorded thereon. Therefore, as the tape decks are driven synchronously, the correlated picture signals have been visually reproduced on the respective displays.

With such conventional multiple display presentation systems, a wiping change from one scene to another has been possible only by prerecording the picture signals on the magnetic tapes so as to realize such a wiping when they are reproduced on the displays. We object to this conventional practice. The recording of picture signals with wiping scene changes has involved a difficult and timing consuming task. The difficulty has become still greater when two or more correlated picture signals must be recorded on separate magnetic tapes for joint wipings on as many juxtaposed displays. Furthermore, the choice of any one of several different wiping modes at the time of recording has precluded all the others; in other words, the different wiping modes have not been selectable at will at the time of reproduction.

SUMMARY OF THE INVENTION

We have hereby invented how to realize wiping scene changes in visual presentation systems of the type defined, without the need for prerecording such wipings.

Briefly, our invention may be summarized as a visual presentation system comprising display means for visually reproducing a picture signal, and signal source means for supplying the picture signal in the form of a succession of picture frames. Connected between the signal source means and the display means is a memory means for storing the successive frames of the picture signal. The memory means is freezable to retain the last frame of an old scene that is reproduced on the display means and which is to be replaced by a new scene in a wipe mode. A memory control circuit is connected to the memory means for controlling the writing of the successive frames of the picture signal on the memory means and the readout of the stored frames therefrom for reproduction on the display means. Also connected to the memory means is a wipe circuit means for causing a wiping scene change to take place on the display means.

For a wiping scene change, the wipe circuit means operates first to freeze the memory means for causing the same to retain the last frame of the old scene, and then to cause selected part of the first frame of the new scene to be written on the memory means with the consequent deletion of the corresponding part of the last frame of the old scene therefrom. Then the wipe circuit means operates to cause a gradual increase with time in the proportion of the new scene stored on the memory means in relation to the proportion of the old scene stored thereon, until the new scene thoroughly replaces the old scene. Thus a wiping change from the old scene to the new scene takes place on the display means as the memory means is repeatedly read under the control of the memory control circuit while the old scene stored on the memory means is being gradually replaced by the new scene under the control of the wipe circuit means.

It will therefore be appreciated that wiping scene changes need not be prerecorded. Wipings can be realized by the combination of the wipe circuit means and the memory means.

Preferably, as in an embodiment of our invention to be set forth subsequently, three cathode ray tube displays may be juxtaposed for joint reproduction of correlated picture signals from as many video disk players. The memory means comprises two frame memories, each capable of storing the successive frames of a picture signal one at a time, connected serially between each disk player and one of the displays. The wipe circuit means is connected to the latter stage frame memories for causing a joint wiping change from old to new scenes to take place on the three displays. Upon commencement of a wiping scene change, the wipe circuit means first freezes the latter stage frame memories, thereby retaining the last frames of the old scenes thereon, and gradually replaces the last frames of the old scenes on the latter stage frame memories with the first frames of new scenes from the preceding frame memories. A joint wiping change from the old to the new scenes takes place on the displays as the latter stage frame memories are repeatedly read during the gradual replacement of the last frames of the old scenes with the first frames of the new scenes.

According to a further feature of our invention, the wipe circuit means comprises a wipe command circuit and a wipe control circuit. The wipe command circuit puts out a wipe mode signal indicative of any selected one of several different wipe modes. Connected between this wipe command circuit and the frame memories, the wipe control circuit functions to cause a wiping scene change to take place on the displays in any selected wipe mode.

Furthermore, the wipe command circuit can deliver to the wipe control circuit a wipe speed signal indicative of any desired wipe speed. The wipe control circuit will respond to this wipe speed signal by causing a wiping at the desired speed.

An additional feature of our invention resides in a switching system whereby each disk player, or any equivalent picture source, can be connected to any of the displays. A variety of different presentation modes will become possible through appropriate use of this switching system.

The above and other features and advantages of our invention and the method of realizing them will become more apparent, and the invention itself will best be understood, from a study of the following description and appended claims, with reference had to the attached drawings showing the preferred embodiment of our invention.

DESCRIPTION OF THE PREFERRED EMBODIMENT

Figure 1:
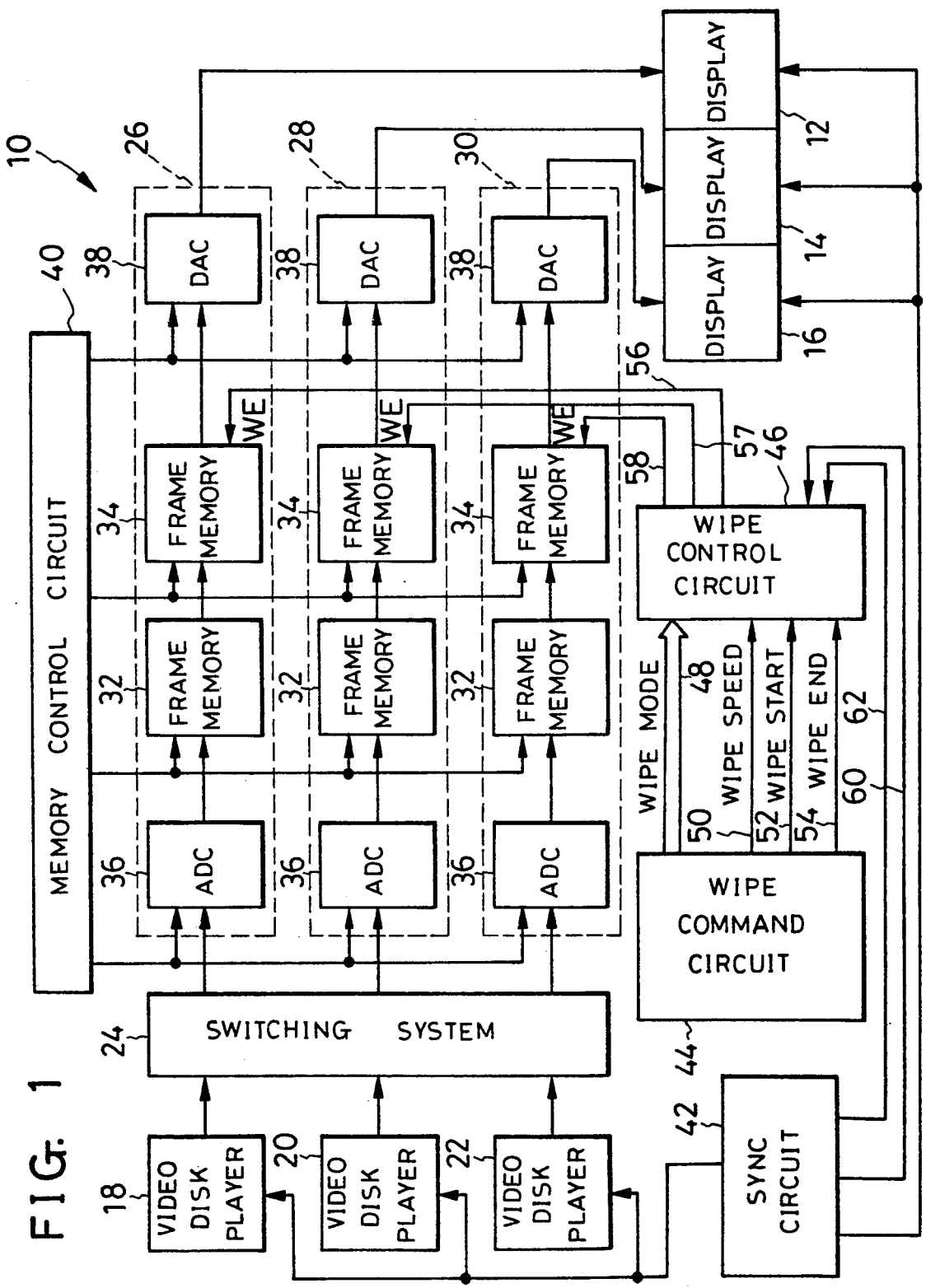
FIG. 1 is a block diagram of a triple display presentation system constructed in accordance with the novel concepts of our invention.

We will now describe our invention in detail as embodied in the triple display presentation system illustrated in FIG. 1 and therein generally designated 10. The representative presentation system 10 has three displays 12, 14 and 16 in juxtaposition. These displays may be of either cathode ray tube or liquid crystal type. The video signals to be simultaneously reproduced by the three displays 12, 14 and 16 are shown supplied from three optical video disk players or decks 18, 20 and 22 of standard construction. These disk players are to be loaded with prerecorded video disks, not shown, for retrieving the video signals therefrom. The video disks can also be of standard design having a multiplicity of recording tracks arranged in the form of either a single multiturn spiral or concentric circles. The video signals may be prerecorded on the video disks in accordance with, for example, the National Television System Committee specifications.

A switching system 24 is connected to the outputs of the video disk players 18, 20 and 22. Comprising electronic switches, the switching system 24 functions to connect each of the three disk players 18, 20 and 22 to any of the three displays 12, 14 and 16.

Three memory means 26, 28 and 30 are connected between the switching system 24 and the respective displays 12, 14 and 16. Each of the memory means 26, 28 and 30 comprises a serial connection of a first 32 and a second 34 memory each capable of storing one frame of digital video signals from video disks. Such memories are commercially available as frame memories. It must be taken into account that video disk players of standard make put out analog video signals, and cathode ray tube displays of standard make accept only analog video signals for reproduction. Accordingly, each of the memory means 26, 28 and 30 is shown to additionally comprise an analog to digital converter 36 on the input side of the frame memories 32 and 34 and a digital to analog converter 38 on their output side.

A memory control circuit 40 is connected to all of the frame memories 32 and 34, analog to digital converters 36, and digital to analog converters 38 of the memory means 26, 28 and 30. It is among the functions of the memory control circuit 40 to control the writing and readout of the digital video signals on and from the frame memories 32 and 34.

A synchronizing circuit 42 is connected to the three video disk players 18, 20 and 22 and to the three displays 12, 14 and 16. Having a master synchronizer, not shown, the synchronizing circuit 42 generates various synchronizing and control signals for synchronizing the disk players and the displays.

At 44 is shown a wipe command circuit connected to a wipe control circuit 46 for giving to the latter a set of wipe commands necessary for a desired wiping change from one scene to another to take place on the displays 12, 14 and 16. The necessary set of wipe commands is comprised of a WIPE MODE command sent over a three bit bus 48, a WIPE SPEED command sent over a line 50, a WIPE START command sent over a line 52, and a WIPE END command sent over a line 54. The WIPE MODE command indicates any of the seven different possible wipe modes illustrated in FIG. 2, to which we will refer presently in more detail.

The wipe control circuit 46 can take the form of a microcomputer in practice. It has three output lines 56, 57 and 58 connected respectively to the write enable terminals WE of the latter stage frame memories 34 of the memory means 26, 28 and 30. The output lines 56, 57 and 58 are intended for the delivery of wipe control signals, such as those shown at (B)–(I) in FIG. 3, in order to cause a wiping to take place on the displays 12, 14 and 16 in a desired mode.

Of course, the wipe control circuit 46 must supply the wipe control signals in timed relation to the video signals to be reproduced. To this end the synchronizing circuit 42 is connected to the wipe control circuit 46 via a vertical synchronizing signal line 60 and a horizontal synchronizing signal line 62. The wipe control circuit 46 is thus enabled to deliver the wipe control signals in timed relation to the vertical or horizontal synchronizing pulses.

Figure 2:
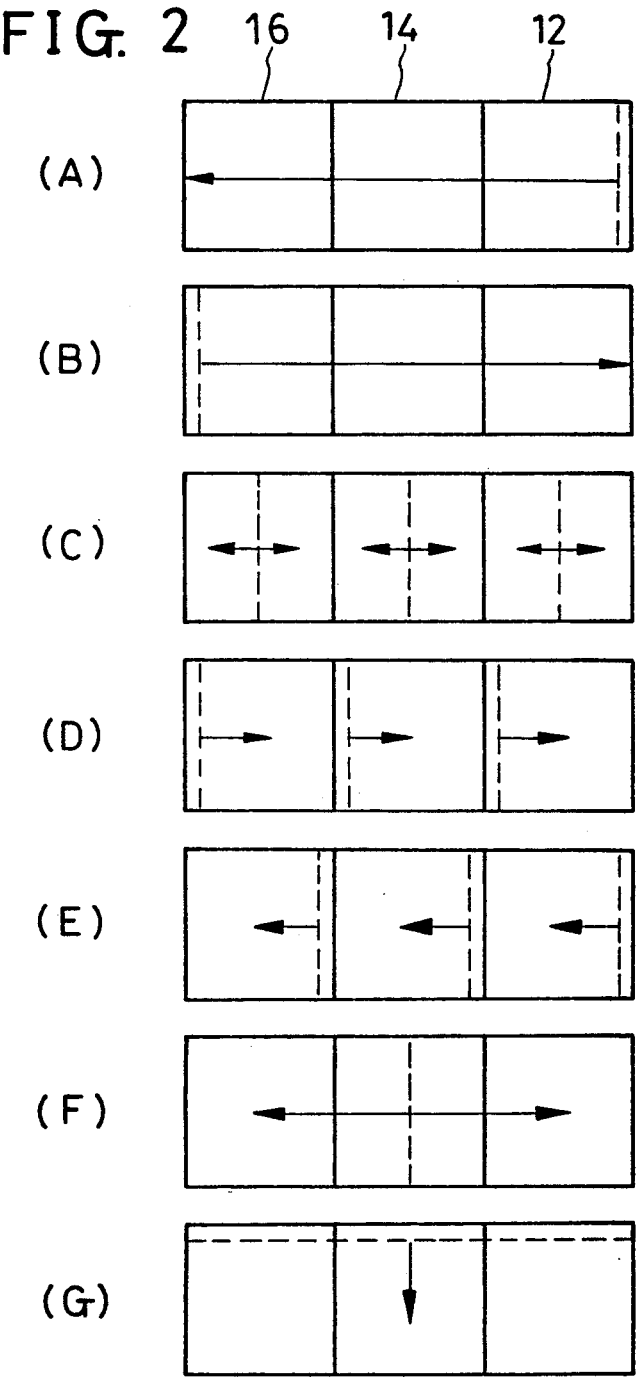
FIG. 2, consisting of (A)–(G), diagrammatically illustrates a set of different wipe modes that are selectively adoptable with the presentation system of FIG. 1.

We assume that the wipe command circuit 44 permits a choice from among the seven different wipe modes pictured at (A)–(G) in FIG. 2. In these pictures the boundaries between the three displays 12, 14 and 16 are indicated by the solid lines, the boundaries between the new and the old scenes by the dashed lines, and the direction of progress of wiping by the arrows.

FIG. 2(A) represents a total, leftward wipe mode. A fraction of the new scene first appears adjacent the right hand edge of the first or right hand display 12. Then the wiping progresses leftward, with the new scene gradually increasing in area with a corresponding decease in the area of the old scene. After replacing the old scene on the right hand display 12, the new scene continues expanding over the central display 14 and then over the left hand display 16 until it thoroughly replaces the old scene on the three displays 12, 14 and 16.

FIG. 2(B) represents a total, rightward wipe mode. This mode similar to the total, leftward wipe mode of FIG. 2(A) except that the displays 12, 14 and 16 are wiped rightward.

FIG. 2(C) depicts a separate, bidirectional wipe mode. Wiping starts at the vertical centerline of each display and simultaneously progresses both rightward and leftward.

FIGS. 2(D) and 2(E) show a separate, rightward wipe mode and a separate, leftward wipe mode, respectively. Wiping starts simultaneously at the left and right hand ends, respectively, of the three displays 12, 14 and 16 and simultaneously proceeds rightward and leftward, respectively.

In FIG. 2(F) is shown a total, bidirectional wipe mode. Wiping starts at the vertical centerline of the central display 14 and simultaneously progresses both rightward and leftward thereon and then on the right and left hand displays 12 and 16.

FIG. 2(G) plots a total, downward wipe mode. The new scene first appears adjacent the top edges of the three displays 12, 14 and 16 and gradually expands downward.

OPERATION

We will describe the operation of the triple display presentation system 10 with an emphasis on how the displays 12, 14 and 16 are wiped for a change from one scene to another. Also, for the ease of understanding of such a wiping scene change, we will disregard the switching system 24 in the following description of system operation, with the understanding that the switching system holds the first 18, second 20 and third 22 disk players connected to the first 12, second 14 and third 16 displays, respectively.

Driven synchronously under the control of the synchronizing circuit 42, the three optical video disk players 18, 20 and 22 will conventionally retrieve the prerecorded video signals from the unshown video disks replaceably loaded therein. The analog video signals put out by the disk players 18, 20 and 22 will be digitized by the respective analog to digital converters 36 of the memory means 26, 28 and 30. Then the digital video signals will be written on the first frame memories 32. Then, read out from these memories 32 under the control of the memory control circuit 40, the video signals will be written on the second frame memories 34. When the wipe control circuit 46 is not activated by the wipe command circuit 44, the successive frames of the video signals will be read out from the second frame memories 34 and, after being reconverted into analog signals by the digital to analog converters 38, reproduced on the three displays 12, 14 and 16.

Immediately before the commencement of wiping, the second frame memories 34 will be frozen by the wipe control circuit 46, retaining the last frames of the old scene to be wiped off by a new one. These last frames will be repeatedly read out from the second frame memories 34 and, after being reconverted into analog signals by the digital to analog converters 38, fed into the displays 12, 14 and 16. Thus the last frames of the old scene will be reproduced on the displays 12, 14 and 16 in still form.

The still images thus reproduced on the displays 12, 14 and 16 may be correlated in one way or another. Preferably, if the total, leftward wipe mode of FIG. 2(A) or the total, rightward wipe mode of FIG. 2(B) is to be employed, the still images should represent separate parts of an essentially single picture.

Subsequently retrieved from the unshown video disks by the disk players 18, 20 and 22, the video signals representative of the new scene for wiping off the old will be written on the first frame memories 32. (These first frame memories 32 might be omitted as desired, and the signals might be written directly on the second frame memories 34.)

For the commencement of a wiping, the wipe command circuit 44 will send to the wipe control circuit 46 the WIPE MODE command over the buss 48 and the WIPE SPEED command over a line 50. Let us assume that the WIPE MODE command indicates the total, leftward wipe mode of FIG. 2(A). Then, as the wipe command circuit 44 delivers the WIPE START command to the wipe control circuit 46 over the line 52, the wiping will start on the right hand display 12.

Figure 3:
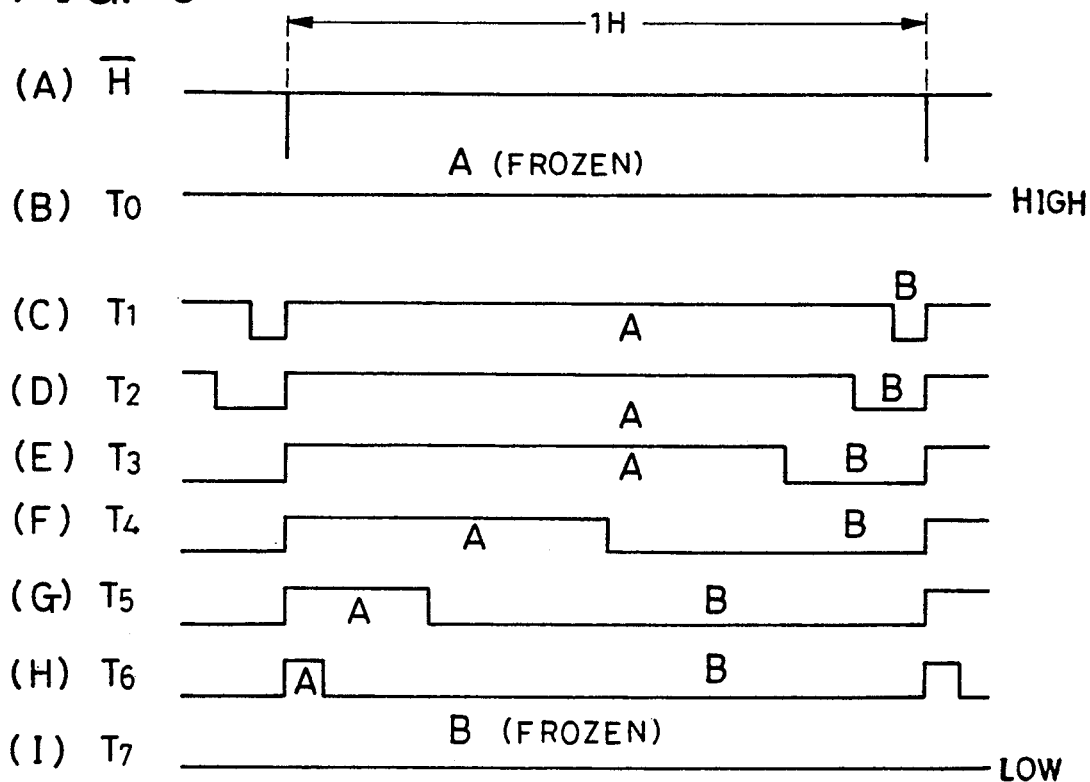
FIG. 3, consisting of (A)–(I), is a diagrammatic illustration of signal waveforms that are useful in explaining the operation of the presentation system.

We have diagramed at (B)–(I) in FIG. 3 the wipe control signal fed from wipe control circuit 46 to frame memory 34 over the line 56 at successive moments $T_0$–$T_7$ in time in order to cause a wiping to take place on the right hand display 12 in the total, leftward mode. FIG. 3(A) indicates the duration of one horizontal scanning period 1 H in proper relation of time to the wipe control signal.

Figure 4:
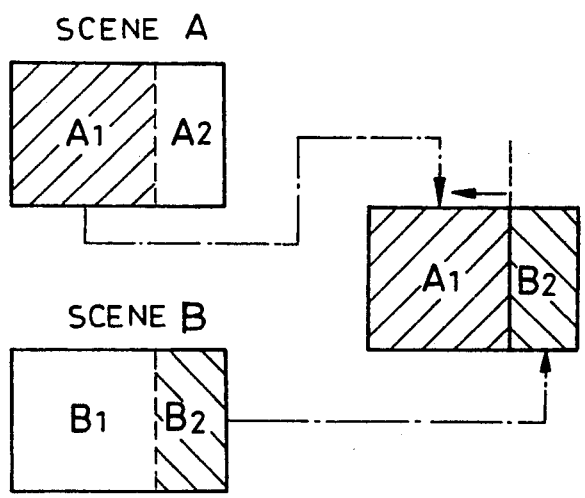
FIG. 4 is a schematic illustration of how a wiping change from one scene to another takes place in the presentation system.

Before studying FIG. 3 in further detail, however, let us briefly refer to FIG. 4 for a consideration of how a wiping change takes place on the right hand display 12 from an old scene A to a new scene B by the total, leftward mode. The old scene A, which is now assumed to be reproduced on the right hand display 12 by being repeatedly read out from the second memory 34, is shown divided into two sections $A_1$ and $A_2$. The new scene B, which is now written on the first memory 32, is also shown divided into two sections $B_1$ and $B_2$. Initially, the second section $B_2$ of the new scene B will be read out from the first memory 32 and written on the second memory 34, thereby replacing the second section $A_2$ of the old scene A. Subsequently read out from the second memory 34, the first section $A_1$ of the old scene A and the second section $B_2$ of the new scene B will be jointly reproduced on the right hand display 12. Then the area occupied by the new scene B on the right hand display 12 will be incrementally expanded to the left until the old scene A is thoroughly driven off the screen.

Referring back to FIG. 3, we will discuss how the wipe control signal fed from the wipe control circuit 46 to the second frame memory 34 of the right hand memory means 26 realizes the wiping change from old scene A to new scene B by the total, leftward mode outlined above.

At (B) in FIG. 3 is shown the wipe control signal to be high. Impressed to the write enable input WE of the second frame memory 34 of the right hand memory means 26, this high wipe control signal will freeze that frame memory, causing the same to retain the last frame of the old scene A. Then, although the video signal representative of the new scene B can be written on the first frame memory 32, this new scene will not be transferred to the frozen second frame memory 34, so that the right hand display 12 will reproduce the old scene A in still form.

Then, as at (C) in FIG. 3, the wipe control signal is shown to develop at the next moment $T_1$ a "negative" wipe pulse just before the end of each horizontal scanning period. It will be noted that the duration of each wipe pulse at this moment is sufficiently brief compared with the horizontal scanning period. The wipe pulses of such brief duration will permit the corresponding fraction $B_2$ of the new scene B to be written on the corresponding storage locations on the second memory 34 by being transferred from the first memory 32, thereby deleting the corresponding fraction $A_2$ of the old scene A from the second memory. Then the remaining part $A_1$ of the old scene A and the fraction $B_2$ of the new scene B will be read out from the second memory 34 and jointly reproduced on the right hand display 12.

The duration of the wipe pulses will increase incrementally with the successive moments $T_1$-$T_6$ in time, as shown at (D)-(H) in FIG. 3. A progressively greater part $B_2$ of the new scene B will be transferred from the first 32 to the second 34 frame memory with such increments in the duration of the wipe pulses. Consequently, the area of the new scene reproduced on the right hand display 12 will correspondingly increase to the left, causing a gradual shrinkage in the area of the old scene.

Incidentally, it is the WIPE SPEED signal fed from wipe command circuit 44 to wipe control circuit 46 that determines the rate of increase of the duration of the wipe pulses and, in consequence, the rate of expansion of the new scene B. Any desired wipe speed may therefore be input to the wipe command circuit 44. The duration of the wipe pulses may be changed at a time interval of an integral multiple of one vertical scanning period.

At (I) in FIG. 3 is shown the wipe control signal to be low, having completed the writing of the new scene B on the second frame memory 34. The new scene B will be reproduced in still form on the right hand display 12 pending the completion of wiping on the other two displays 14 and 16.

The central 14 and left hand 16 displays have continued the reproduction of the old scene A in still form during the above discussed wiping change from the old to the new scene on the right hand display 12. This is because the wipe control circuit 46 has maintained the application of high wipe control signals to the second frame memories 34 of the memory means 28 and 30 over the lines 57 and 58 during that time. The second frame memories 34 of the memory means 28 and 30 have therefore been frozen to retain the old scene A.

Upon completion of the wiping of the old scene A with the new B on the right hand display 12, the wipe control circuit 46 will proceed to cause a similar wiping on the central display 14. To this end the wipe control circuit 46 will apply to the second frame memory 34 of the memory means 28 a wipe control signal that will vary with time as shown at (B)-(I) in FIG. 3. Thus, on this frame memory, too, the old scene A will be gradually replaced by the new scene B, resulting in the wiping of the old scene with the new on the central display 14. The new scene B will be reproduced in still form on the central display 14 pending the completion of wiping on the left hand display 16.

Then the wipe control circuit 46 will proceed to cause a similar wiping on the left hand display 14. Again the wipe control circuit 46 will apply to the second frame memory 34 of the memory means 30 a wipe control signal that will vary with time as shown at (B)-(I) in FIG. 3. Thus the new scene B will wipe the old scene A off the left hand display 14 through a similar procedure.

With the wiping operation in the total, leftward mode thus completed on the three displays 12, 14 and 16, the wipe command circuit 44 will deliver a normal operation command to the wipe control circuit 46 over the bus 48. The frame memories 34 of all the memory means 26, 28 and 30 will then be unfrozen, so that the displays 12, 14 and 16 will start reproducing the new scene B in continuous motion.

POSSIBLE MODIFICATIONS

Although we have shown and described the visual presentation system of our invention in highly specific aspects thereof, we do not wish our invention to be limited by the exact details of such disclosure. The following, then, is a brief list of possible modifications, alterations and adaptations of the illustrated embodiment which we believe all fall within the scope of our invention:

1. The optical video disk players could be replaced by other sources of picture signals such as magnetic tape players, magnetic disk players, or video cameras.

2. Only one such signal source could be employed in combination with one or more memory means and one or more displays.

3. The switching system 24, though not an essential feature of our invention, could be connected between the memory means 26, 28 and 30 and the displays 12, 14 and 16.

4. A wiping change from one scene to another could be effected on only one or two of the displays, the other display or displays maintained to reproduce continuous motion pictures.

5. The first frame memories 32 could be omitted.

What we claim is:

1. A visual presentation system providing for a change from one reproduced scene to another in a wipe mode, comprising:
    (a) display means for visually reproducing a picture signal;
    (b) signal source means for supplying successive frames of the picture signal for reproduction on the display means;
    (c) memory means connected between the signal source means and the display means for storing the successive frames of the picture signal, the memory means being freezable to retain the last frame of an old scene that is reproduced on the display means and which is to be replaced by a new scene in said wipe mode;
    (d) a memory control circuit connected to the memory means for controlling the writing of the successive frames of the picture signal on the memory means and the readout of the stored frames therefrom for reproduction on the display means; and
    (e) wipe circuit means connected to the memory means for freezing the same to retain the last frame of the old scene thereon upon commencement of a wiping scene change and for causing a selected part of the first frame of the new scene to be written on the memory means with the consequent deletion of the corresponding part of the last frame of the old scene therefrom, the wipe circuit means causing a gradual increase with time in the proportion of the new scene stored on the memory means in relation to the proportion of the old scene stored thereon until the new scene stored on the memory means in relation to the proportion of the old scene stored thereon until the new scene thoroughly replaces the old scene;
    (f) whereby said wiping change from the old scene to the new scene takes place on the display means as the memory means is repeatedly read under the control of the memory control circuit while the old scene stored on the memory means is being gradually replaced by the new scene under the control of the wipe circuit means.

2. The visual presentation system of claim 1 wherein the memory means comprises a serial connection of two frame memories.

3. The visual presentation system of claim 1 wherein the wipe circuit means comprises:
   (a) a wipe command circuit for providing a wipe mode signal indicative of any selected one of a plurality of different wipe modes; and
   (b) a wipe control circuit connected between the wipe command circuit and the memory means for causing said wiping change from the old scene to the new scene to take place in the selected wipe mode.

4. A multiple display presentation system providing for a joint change from one reproduced scene to another in a wipe mode displays, comprising:
   (a) a first and a second display juxtaposed for visually reproducing picture signals;
   (b) signal source means for supplying successive frames of the picture signals for reproduction on the first and the second displays;
   (c) first and second memory means connected between the signal source means and the first and the second displays, respectively, for storing the successive frames of the picture signals, the memory means being freezable to retain the last frames of old scenes that are reproduced on the displays and which are to be replaced by new scenes in a wipe mode;
   (d) said memory control circuit connected to the first and the second memory means for controlling the writing of the successive frames of the picture signals thereon and the readout of the stored frames therefrom for reproduction on the first and the second displays; and
   (e) wipe circuit means connected to the first and the second memory means for freezing the same to retain the last frames of the old scenes thereon upon commencement of a wiping scene change in a preselected wipe mode, the wipe circuit means gradually replacing the last frames of the old scenes with the first frames of the new scenes on the first and the second memory means in a manner determined by the preselected wipe mode;
   (f) whereby a wiping change from the old to the new scenes takes place in the preselected wipe mode on the first and the second displays as the first and the second memory means are repeatedly read under the control of the memory control circuit while the old scenes stored on the first and the second memory means are being gradually replaced by the new scenes under the control of the wipe circuit means.

5. The presentation system of claim 4 wherein each of the first and second memory means comprises a serial connection of two frame memories.

6. The presentation system of claim 4 wherein the wipe circuit means comprises:
   (a) a wipe command circuit for providing a wipe mode signal indicative of any selected one of a plurality of different wipe modes; and
   (b) a wipe control circuit connected between the wipe command circuit and the first and the second memory means for causing said wiping change from the old to the new scenes to take place in the selected wipe mode.

7. A multiple display presentation system providing for a joint change from one reproduced scene to another in a wipe mode on a plurality of displays, comprising:
   (a) said plurality of displays juxtaposed for visually reproducing picture signals;
   (b) a plurality of playback devices for supplying sucessive frames of the picture signals for reproduction on the respectivee displays;
   (c) a plurality of first frame memories connected one to each of said playback devices for temporarily storing the successive frames of the picture signal therefrom one at a time;
   (d) a memory control circuit connected to the first frame memories for controlling the writing of the successive frames of the picture signals thereon and the readout of the stored frames therefrom;
   (e) a plurality of second frame memories connected respectively between the first frame memories and the displays for temporarily storing the successive frames of the picture signals read out from the first frame memories, the memory control circuit being connected to the second frame memories for controlling the writing of the successive frames of the pictures signals thereon and the readout of the stored frames therefrom for reproduction on the displays, the second frame memories being freezable to retain the last frames of old scenes that are reproduced on the displays and which are to be replaced by new scenes in said wipe mode;
   (f) a wipe command circuit for permitting a choice from among a plurality of different wipe modes; and
   (g) a wipe control circuit connected between the wipe command circuit and the second frame memories for causing a wiping change from the old to the new scenses to take place on the displays in a selected wipe mode, the wipe control circuit being effective to freeze the second frame memories upon commencement of said wiping scene change for retaining the last frames of the old scenes thereon and to gradually replace the last frames of the old scenes on the second frame memories with the first frames of the new scenes from the first frame memories in a manner determined by the selected wipe mode;
   (h) whereby said wiping change from the old to the new scenes takes place in the selected wipe mode on the displays as the second frame memories are repeatedly read under the control of the memory control circuit while the old scenes stored on the second frame memories are being gradually replaced by the new scenes from the first frame memories under the control of the wipe control circuit.

8. The presentation system of claim 7 further comprising a switching system for selectively connecting each said playback devices to any of the displays via one of the first frame memories and one of the second frame memories.

* * * * *